United States Patent
Suloway et al.

(10) Patent No.: US 10,352,632 B2
(45) Date of Patent: Jul. 16, 2019

(54) HEAT TRANSFER UTILIZING VASCULAR COMPOSITES AND FIELD INDUCED FORCES

(71) Applicants: Theresa H. Suloway, Rockville, MD (US); Sameh S. Wanis, Washington, DC (US)

(72) Inventors: Theresa H. Suloway, Rockville, MD (US); Sameh S. Wanis, Washington, DC (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 440 days.

(21) Appl. No.: 15/166,079

(22) Filed: May 26, 2016

(65) Prior Publication Data

US 2017/0341727 A1 Nov. 30, 2017

(51) Int. Cl.
| | |
|---|---|
| F28F 13/16 | (2006.01) |
| F28F 21/00 | (2006.01) |
| F28F 7/00 | (2006.01) |
| F28F 13/10 | (2006.01) |
| F28F 27/00 | (2006.01) |
| F28D 21/00 | (2006.01) |
| B64D 33/04 | (2006.01) |

(52) U.S. Cl.
CPC ............... *F28F 13/16* (2013.01); *F28F 7/00* (2013.01); *F28F 13/10* (2013.01); *F28F 21/00* (2013.01); *F28F 27/00* (2013.01); *B64D 2033/045* (2013.01); *F28D 2021/0021* (2013.01); *F28D 2021/0028* (2013.01); *F28F 2250/08* (2013.01)

(58) Field of Classification Search
CPC .... F28F 7/02; F28F 13/10; F28F 13/16; F28F 2250/08; F28F 7/00; F28F 27/00; F28F 21/00; F28D 2021/0028

USPC ....................................... 165/104.28, 104.22
See application file for complete search history.

(56) References Cited

U.S. PATENT DOCUMENTS

| | | | | |
|---|---|---|---|---|
| 3,478,234 A | * | 11/1969 | Prem ................... | H02K 44/085 310/11 |
| 4,171,852 A | * | 10/1979 | Haentjens ............. | B65G 53/30 406/85 |
| 4,505,644 A | * | 3/1985 | Meisner ................ | H02K 44/06 417/50 |
| 5,263,793 A | * | 11/1993 | Sirovich ................ | B64C 21/10 138/39 |
| 6,010,316 A | * | 1/2000 | Haller ................. | B01L 3/50273 366/DIG. 4 |

(Continued)

OTHER PUBLICATIONS

Mohyud-Din et al., Numerical investigation of magnetohydrodynamic flow and heat transfer of copper-water nanofluid in a channel with non-parallel walls considering different shapes of nanoparticles, Mar. 8, 2016.*

*Primary Examiner* — Devon Russell
(74) *Attorney, Agent, or Firm* — Taarolli, Sundheim, Covell & Tummino LLP

(57) ABSTRACT

A system includes a matrix material to remove heat from an object. The matrix material includes a plurality of vascular structures. Each of the vascular structures are filled with a fluid. At least one transducer generates field-induced forces into the fluid within the vascular structures of the matrix material. At least one controller pulses the transducer to generate the field-induced forces into the fluid within the vascular structures. The field-induced forces generate fluid flow within the vascular structures to remove the heat from the object.

19 Claims, 7 Drawing Sheets

(56) References Cited

U.S. PATENT DOCUMENTS

| | | | | |
|---|---|---|---|---|
| 6,221,275 B1* | 4/2001 | Choi | C09K 5/10 | 165/104.19 |
| 6,234,765 B1* | 5/2001 | Deak | F04F 7/00 | 417/321 |
| 7,265,977 B2* | 9/2007 | Martin | H01L 23/473 | 165/80.4 |
| 7,621,319 B2* | 11/2009 | Ouyang | F28D 15/00 | 165/104.21 |
| 7,672,129 B1* | 3/2010 | Ouyang | H01L 23/473 | 165/104.33 |
| 8,017,872 B2* | 9/2011 | Cripe | H05K 1/0272 | 174/252 |
| 8,616,266 B2* | 12/2013 | Wilcoxon | F28D 15/00 | 165/134.1 |
| 8,650,886 B2* | 2/2014 | Wilcoxon | F04B 17/00 | 62/3.2 |
| 9,275,629 B2* | 3/2016 | Beslin | G10K 9/125 | |
| 2003/0215342 A1* | 11/2003 | Higashino | F04B 43/043 | 417/322 |
| 2004/0182088 A1* | 9/2004 | Ghoshal | H01L 23/473 | 62/3.7 |
| 2006/0090474 A1* | 5/2006 | Sauciuc | F28D 15/00 | 62/3.2 |
| 2007/0020124 A1* | 1/2007 | Singhal | F04B 43/043 | 417/413.2 |
| 2008/0196875 A1* | 8/2008 | Kurtz | F28F 3/048 | 165/167 |
| 2010/0195074 A1* | 8/2010 | Sogard | F28D 15/00 | 355/67 |
| 2011/0097763 A1* | 4/2011 | Pollack | B01L 3/502792 | 435/91.2 |
| 2011/0138838 A1* | 6/2011 | Despesse | F04B 17/00 | 62/324.1 |
| 2012/0273164 A1* | 11/2012 | Vetrovec | H01L 23/473 | 165/104.13 |
| 2016/0116223 A1* | 4/2016 | Carpenter | F28D 15/00 | 165/104.28 |
| 2016/0377328 A1* | 12/2016 | Hurbi | F25B 21/00 | 62/3.1 |
| 2017/0261866 A1* | 9/2017 | Cadee | F28D 15/02 | |

* cited by examiner

US 10,352,632 B2

HEAT TRANSFER UTILIZING VASCULAR COMPOSITES AND FIELD INDUCED FORCES

TECHNICAL FIELD

This disclosure relates to heat transfer systems, and more particularly to a matrix material embedded with fluid filled channels that are excited via field induced forces to remove heat from an object.

BACKGROUND

Heat transfer relates to the exchange of thermal energy between physical systems. The rate of heat transfer is dependent on the temperatures of the systems and the properties of the intervening medium through which the heat is transferred. The direction of heat transfer is from a region of high temperature to another region of lower temperature, where heat transfer changes the internal energy of the systems from which and to which the energy is transferred. Thermal equilibrium is reached when all involved bodies and the surroundings reach the same temperature. Heat transfer systems have many applications with respect cooling vehicles such as aircraft or land vehicles. In one specific example, it is desirable for aircraft systems to be able to reduce the respective infrared (IR) heat signature and to therefore increase the stealth of the system. Current aircraft do not have an IR signature management system. Traditional heat dissipation techniques involve the use of pumps which have high maintenance requirements. These technologies are difficult to impossible to retrofit onto existing aircraft as they require modification of the airframe itself (e.g., cutting holes into the aircraft skin). Furthermore, in order to place a cooling pump or other heat transfer device on/in the aircraft, some other subsystem must be removed because there is no available usable space within modern aircraft. Thus, any new modification to the system must be certified which is costly and may take years.

SUMMARY

This disclosure relates to a matrix material that includes fluid-filled vascular structures that are excited via field induced forces to remove heat from a structure. In one aspect, a system includes a matrix material to remove heat from an object. The matrix material includes a plurality of vascular structures. Each of the vascular structures are filled with a fluid. At least one transducer generates field-induced forces into the fluid within the vascular structures of the matrix material. At least one controller pulses the transducer to generate the field-induced forces into the fluid within the vascular structures. The field-induced forces generate fluid flow within the vascular structures to remove the heat from the object.

In another aspect, an apparatus includes a matrix material to remove heat from an object. A plurality of vascular structures are embedded in the matrix material. Each of the vascular structures are filled with a fluid. A plurality of particles with higher heat capacity than the fluid are embedded in the fluid to facilitate the removal of heat from the object based on movement of the particles. The movement of particles within the fluid are in response to field-induced forces applied to the vascular structures.

In yet another aspect, a method includes pulsing at least one transducer to generate field-induced forces into vascular structures of a matrix material. The method includes moving a fluid within the vascular structures in response to the field-induced forces. The method includes applying the matrix material to an object. The method includes removing heat from the object based on movement of the particles within the vascular structures of the matrix material in response to the field-induced forces.

DETAILED DESCRIPTION

This disclosure relates to a matrix material that includes fluid-filled vascular structures that are excited via field-induced forces to remove heat from an object. A system and method facilitate transferring heat from an area of high heat on an object (e.g., air or land vehicle) to a cool surface of the object utilizing a vascular composite material to remove heat from the object. Such material can also be referred to as a matrix material that can include embedded transducers that spans the hot and cold areas of the respective object. The transducers apply field-induced forces to the material to move fluids within the material to cause heat convection flow from the object. The matrix material can include embedded channels filled with fluid and particles to facilitate heat removal from the object. The matrix material can have a series of ultrasonic transducers and a controller attached to it to circulate fluids and particles within the respective channels to facilitate convection flow. The fields induced by the transducers apply a force on the particles within the channels to circulate both fluids and particles through a respective channel. If the channel is circular for example, the transducers can circulate fluids within a vascular composite structure of the material to cool and redistribute cooling fluids on a given surface of the vehicle. The matrix material and system can support many heat removal applications such as for aircraft skin cooling, for example. By reducing the heat on the respective aircraft, its respective heat signature can be reduced thus increasing the overall stealth of the aircraft. The convection flow provided can be sufficient to reduce the overall infrared (IR) signature of the aircraft, thus making it difficult to detect with Infrared search and track (IRST) sensors. The ability to be stealthy in IR can support intelligence gathering for airborne and space vehicles, for example. Moreover, the matrix material and system can be installed as an aftermarket addition with little alteration to the original vehicle which mitigates costly retesting and recertification of the original vehicle after installation.

Figure 1:
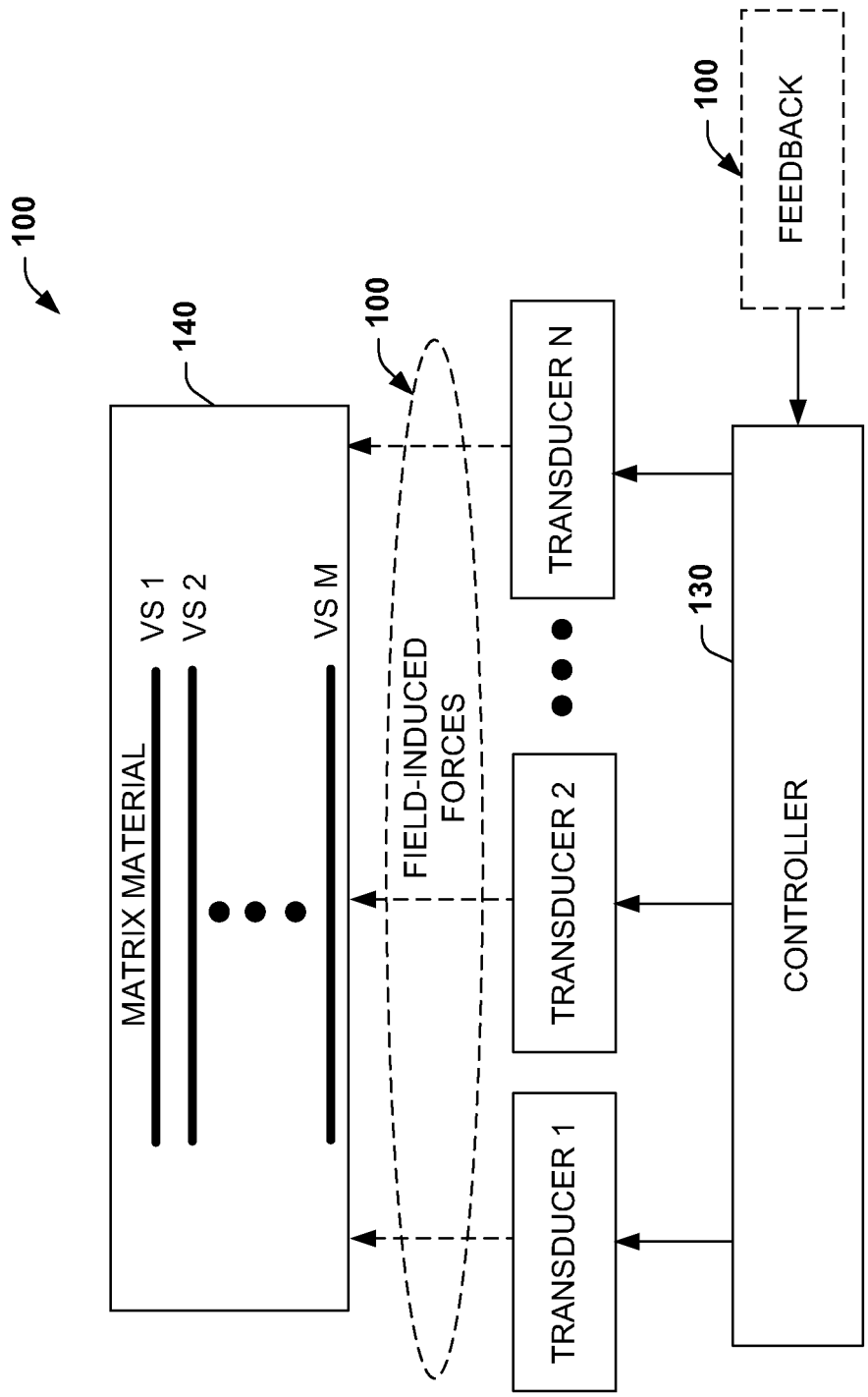
FIG. 1 illustrates an example of a system that employs a matrix material to remove heat from an object.

FIG. 1 illustrates an example of a system 100 that employs a matrix material 110 to remove heat from an object. The matrix material 110 includes a plurality of vascular structures shown as VS 1 though VS M, with M being a positive integer. Each of the vascular structures in the matrix material 110 are filled with a fluid. At least one transducer, shown as transducer 1 though N, with N being a positive integer, injects field-induced forces into the fluid within the vascular structures of the matrix material 110. At least one controller 120 pulses the transducers 1-N to generate the field-induced forces into the fluid within the vascular structures VS 1 though VS M. The field-induced forces move the fluid within the vascular structures in the matrix material 110 to remove heat from the object. In this system example, the object is not shown, however the matrix material 110 can be applied to the object (e.g., as an overly material on the object) to remove heat from the object as the fluid is moved in the vascular structures in response to the field-induced forces In one example, the controller 120 can operate in open-loop mode and apply a predetermined pattern of pulses to the transducer 1-N to generate the field-induced forces. The pulses include a pulse frequency and a pulse duty cycle. As used herein, the pulse frequency refers to the number of times a pulse is repeated over a given time period whereas duty cycle refers to the amount of on time with respect to off time of the respective pulse from the controller 120. A subset of transducers may be pulsed on at a given frequency and duty cycle whereas another subset may be pulsed off during the on time pulsing of the other subset. The controller 120 can operate from a memory (not shown) (e.g., memory or register circuit of CMOS transistor devices) to generate the pulses described herein. The controller 120 can include a processor (e.g., processor circuit, application specific integrated circuit ASIC)) executes instructions (e.g., logic configured in memory, gate array, or registers) from the memory. The processor 140 can be a central processing unit (CPU), field programmable gate array (FPGA), ASIC, or a set of logic circuits that can be defined via a hardware description language such as VHDL. The instructions can be executed out of firmware, random access memory, and/or executed as configured logic circuits such as via registers, flip/flops, and/or state machines configured in a gate array, for example.

In another example, the controller 120 can operate in closed-loop mode where it receives temperature feedback 130 from the object to control a pulse frequency or a pulse duty cycle applied to the transducer 1-N. The pulse frequency can be varied in frequency based on a given size of the vascular structures. For example, if the vascular structures VS 1 though VS M are in the 1 to 10 micron diameter, the respective excitation frequencies applied to the structures can be in the megahertz range. For smaller diameter structures (e.g., carbon nano tubes), higher frequencies can be applied and for larger diameter structures (e.g., several microns), lower frequencies can be applied (e.g., kilohertz range).

The objects described herein can be a vehicle in one example that includes at least one of an aircraft or a land vehicle, where the matrix material 110 is applied to a portion of the vehicle to remove heat from the vehicle. In another example, the object can be an interior structure such as a printed circuit board (PCB) where the matrix material wraps or is applied to the PCB to remove heat therefrom. In yet another example, the object can be a device such as an infrared camera where the matrix material is applied to all or portions of the camera to remove heat therefrom. Such cameras can be deployed on other objects such as aircraft to gather data during a given aircraft mission. By cooling the camera (or other sensor/device) in this manner, the performance of the camera is maintained versus traditional cooling methods but in a smaller SWAP (size weight and power) form factor.

The vascular structures VS1 though VS M can be cylindrical (e.g., tubes) or cubic structures that are filled with the fluid. For example, the vascular structures VS 1 though VS M can be circular tubes or linear ducts that are filled with the fluid (See e.g., FIG. 2). The fluid in the vascular structures can be at least one of deionized water, Anhydrous Ammonia, Propylene, Betaine, Ethylene Glycol, Diethylene Glycol, Propylene Glycol, Liquid Nitrogen, Liquid Oxygen and Freon, for example. To increase the heat removal efficiency of the fluid, particles can be embedded within the fluid. The embedded particles can include at least one of aluminum and copper, for example. The matrix material 110 can be fabricated from at least one of a carbon, an epoxy, and a polymer, for example.

The transducers 1-N can generate acoustic energy (e.g., speaker below about 20 khz), ultrasonic energy (e.g., speaker above 20 khz), or generate electromagnetic energy (e.g., magnetic forces) to inject the field-induced forces into the fluid within the vascular structures of the matrix material 110. The application of field-induced forces to initiate particle movement within the vascular structures VS 1 through VS M is based on a principle that a particle placed in a medium having a different impedance from itself will experience forces if a wave is set up in that medium. Such waves can be generated as standing waves within the vascular structures. A collection of particles can self-assemble into a shape governed by the geometry of the field applied to the vascular structures. Therefore, the placement of the accumulated particles (e.g., the shape of the structure being formed) can be tailored by externally controlling the field via the transducers 1-N. Thus, no physical contact with the particles themselves is necessary to cause particle movement within the vascular structures. Particle-particle forces also play a role in successful shape formation. For particles that are small relative to the wavelength of the applied standing wave, the inter-particle forces can be derived from dipole-dipole interactions and thus have regions of both attraction and repulsion.

A particle having an impedance different from that of its host medium will experience forces from a wave setup in that medium, owing to gradients in energy density. That behavior can be understood by treating such particles as radiating dipoles and monopoles or a combination thereof. A small dielectric particle can be polarized if placed in an alternating electric field, such as that in a standing electromagnetic wave. If that particle is about one order of magnitude smaller than the wavelength (electrostatic limit, $\nabla \times E=0$, where $\nabla$ is the del operator and E is the electric field), then the polarized dielectric can be represented as an equivalent electric dipole. Analogously, a small particle that is denser than its host medium can radiate as an acoustic dipole in the presence of an acoustic wave. As long as the size criterion is met, $ka \ll 1$, where k is the wave number and a is the particle diameter, the behavior of a single particle in a standing-wave field—whether acoustic or electromagnetic—is then described by treating the particle as an equivalent dipole. In acoustic fields, small particles may also radiate monopole fields in proportion to the contrast in compressibility between the particles and their host fluid medium. The expressions governing the force onto a single particle can be unified in both an acoustic and an electromagnetic field through a generalization of the variables.

When multiple particles are present, the interactions that are considered include not only the interaction of the dipole (e.g., polarized dielectric in electric fields and acoustic dipoles in alternating pressure fields) with the field, but also its interaction with the other particles through dipole-dipole interactions. Treating the particles and their response to the external field and to each other through dipole interactions reduces the problem to an analytical one, where a potential field is defined to represent the standing acoustic or electromagnetic wave, and acoustic or electromagnetic dipoles are used to represent the particles.

Figure 2:
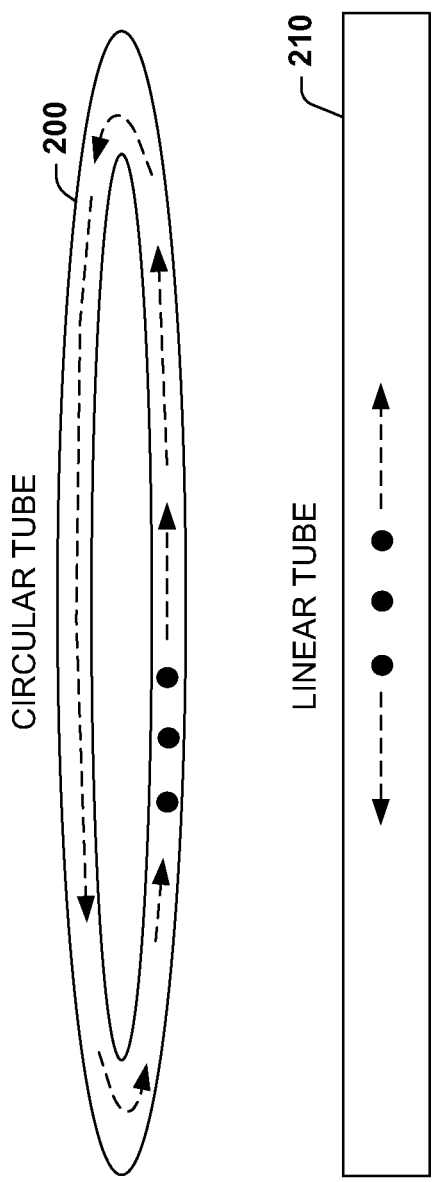
FIG. 2 illustrates examples of vascular structures that can be embedded within a matrix material.

FIG. 2 illustrates examples of vascular structures that can be embedded within a matrix material. In one example, a circular tube 200 can be provided as the vascular structures described herein. The tube 200 can be fluid filled and can have embedded particles in the fluid. When the field-induced forces are applied to the tube 200, the particles move in a circular pattern around the tube. As the particles move, heat is transferred away from a given surface of an object that are in contact with the tube 200. As used herein, the term tube can include cylindrical three-dimensional structures in one example. In another example, rather than a cylindrical shape, the tube 200 can include a cubic shape where a rectangular three-dimensional structure is provided in place of the cylindrical structure. Other examples include polygon structures such as pentagon, hexagon, and octagon structures.

In another example a tube 210 can include a linear tube that does not wrap around on itself like the tube 200. In the linear example (e.g., linear duct), particles may accumulate at one end or another of the tube 210. In such cases, excitation frequencies and patterns applied to the transducers may have to be alternated to cause a change in direction of the particles from one end of the tube 210 to another. In some cases, transducer pulse pattern alteration can be based on feedback received by the controller described above. For example, if temperature feedback indicates and increase in temperature, the controller can change its pulse pattern to the transducers to cause particles to flow in the opposite direction of the tube 210. In yet another example, pulse patterns to the transducers can be alternated at a predetermined interval (e.g., every second change pattern to cause particles to migrate in the opposite direction).

Figure 3:
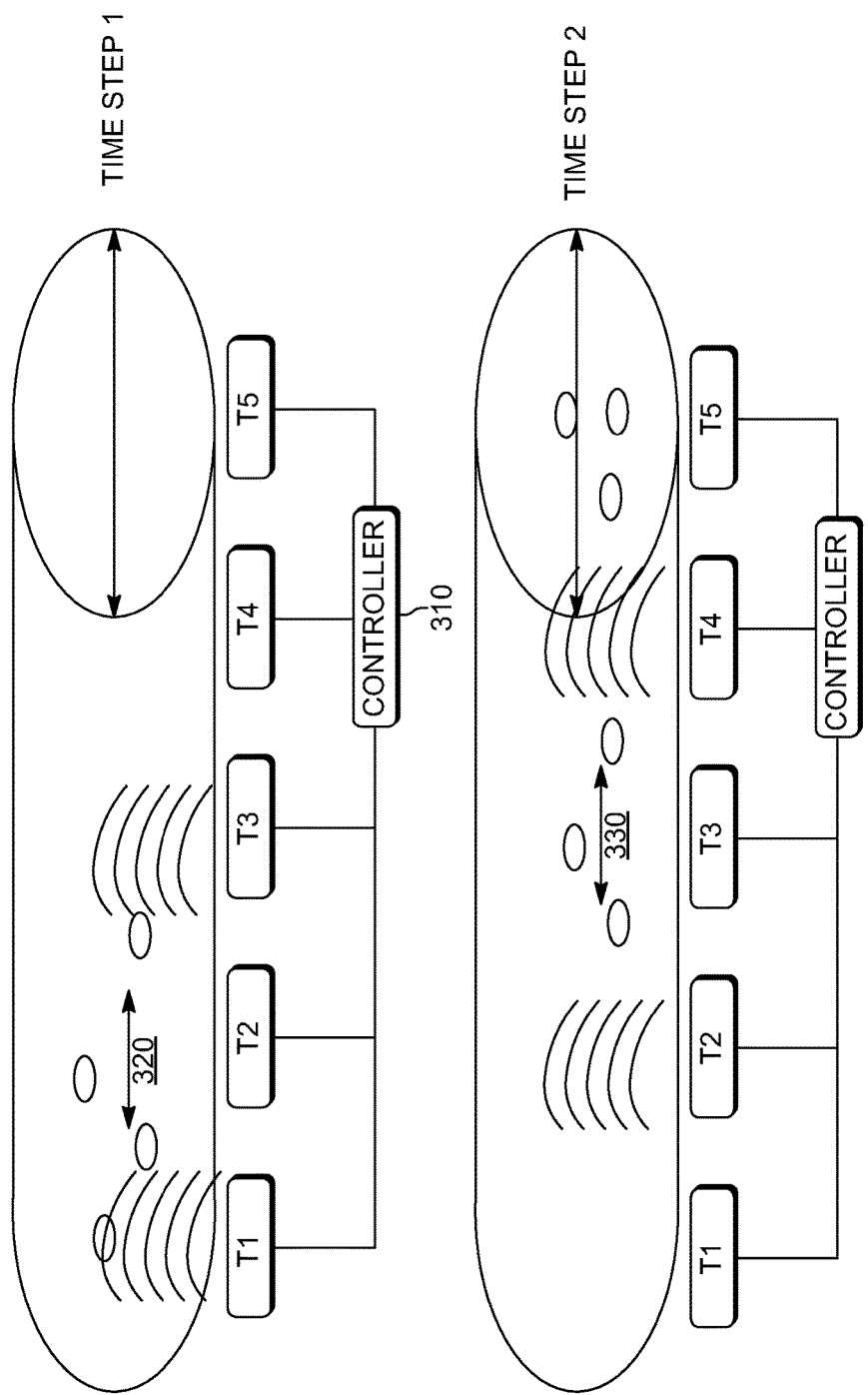
FIG. 3 illustrates an example of a controller and transducer configuration to cause particle movement within a vascular structure over different time periods.

FIG. 3 illustrates an example of a controller and transducer configuration to cause particle movement within a vascular structure over different time periods. At a given time period shown as time step 1, transducers T1 through T5 are excited by a controller 310. It is noted that more or less than five transducers can be employed than shown in this example. In this example, transducers T1, T3, and T5 are excited and transducers T2 and T4 are not excited to begin particle movement shown at 320. In another excitation period shown as time step 2, transducers T2 and T4 are excited while transducers T1, T2, and T3 are turned off to cause particle movement shown at 330. Substantially any excitation pattern can be applied. For instance, transducers could be turned on in pairs T1/T2 on and T3/T4 off during one time period where each pair is in turn alternated on and off in subsequent time periods.

If nine transducers were employed, transducers subsets of three could be alternatively turned on and off to cause particle movement in a given direction. In addition to controlling on and off times of the respective transducers, duty cycles can be controlled where instead of 50% on and 50% off times are employed, more or less on versus on time can be provided. For example, a first transducer subset may be turned on for 25% of a given time period and a second transducer subset may be turned on for 75% of the given time period. Also, the frequency of the alternating patterns can be changed in addition to individual excitation frequencies applied to each transducer that can be collectively and/or individually adjusted.

Figure 4:
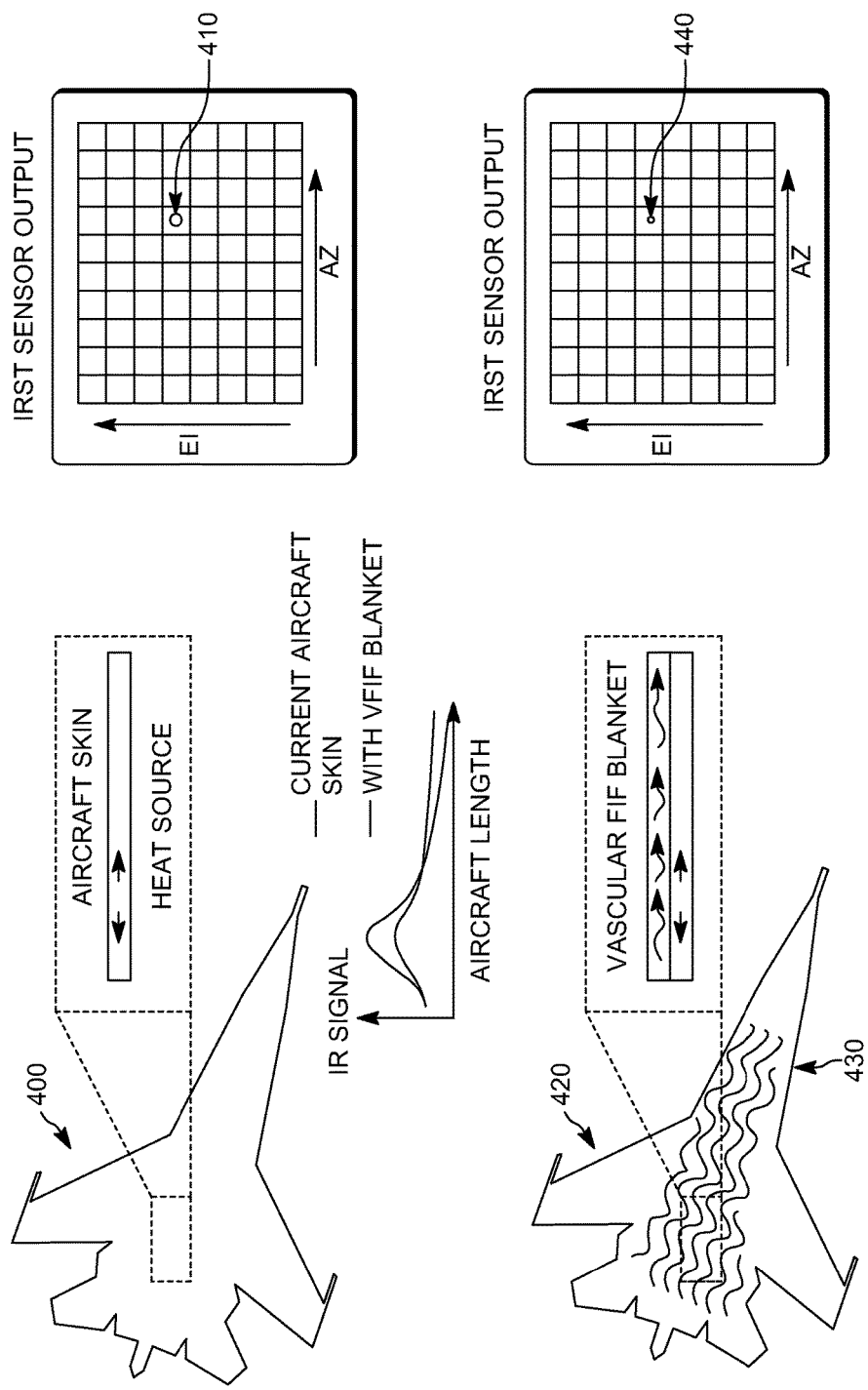
FIG. 4 is an example of a matrix material being applied to an aircraft to remove heat from the aircraft.

FIG. 4 is an example of a matrix material being applied to an aircraft to remove heat from the aircraft. The matrix material can cover an entire object, cover a single portion of the object, or can be employed as separate materials and systems to affect heat removal from selected portions of the object. When multiple matrix material applications are applied to a given object, each application can have its own controller and transducer subset as described herein to control heat removal. In this example, a conventional aircraft 400 is shown that does not have the matrix material and control system described herein to remove heat from the aircraft. At 410, an IR sensor output graph is shown that describes the respective heat signature for the aircraft. An IR sensor (not shown) can be pointed at the aircraft to detect the respective heat signature and generate the graph 410.

An aircraft 420 includes a matrix material 430 and transducer/control system (not shown) to remove heat from the aircraft. An IR Sensor graph 440 shows a reduced heat signature for the aircraft 420 when utilizing the matrix material 430. As noted previously, the matrix material 430 can be applied to any system or subsystem to remove heat. These can include land vehicles, isolated power systems, modules, and so forth where the matrix material 430 can be applied to remove heat. As will be shown with respect to FIG. 5 below, more than one section of the aircraft can have matrix material and associated transducer/controller subsystems to remove heat from different portions of the aircraft.

Figure 5:
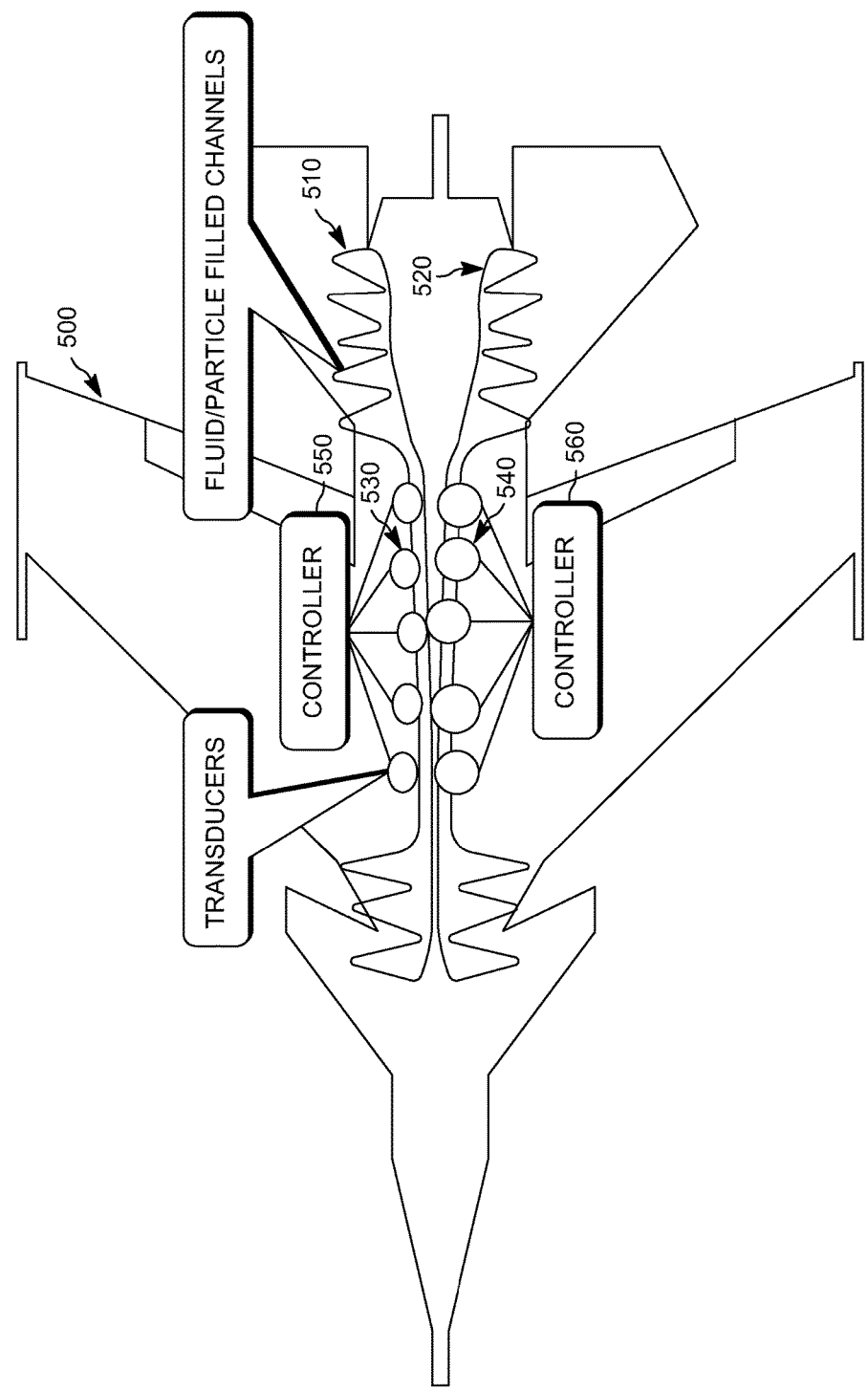
FIG. 5 illustrates an example of an aircraft that employs multiple matrix materials and excitation components to remove heat from the aircraft.

FIG. 5 illustrates an example of an aircraft 500 that employs multiple matrix materials and excitation components to remove heat from the aircraft. In this example, two matrix material overlays are installed at 510 and 520. In other object examples, more than two areas of the object can have respective matrix material applications to remove heat from selected portions of the object. Each of the overlays 510 and 520 can be formed to fit a general area on the aircraft 500 to remove heat from the aircraft. The overlays 510 and 520 can include vascular structures that are filled with fluids having particles embedded therein. Each overlay 510 can 520 can be excited via a transducer set shown at 530 and 540 respectively. The transducer set at 530 can be controlled via controller 550 and the transducer set 540 can be controlled via controller 560. In another example, a single controller could control all the transducers in the sets 530 and 540. A single controller example is shown in FIG. 6 controlling more transducers than shown in FIG. 5.

Figure 6:
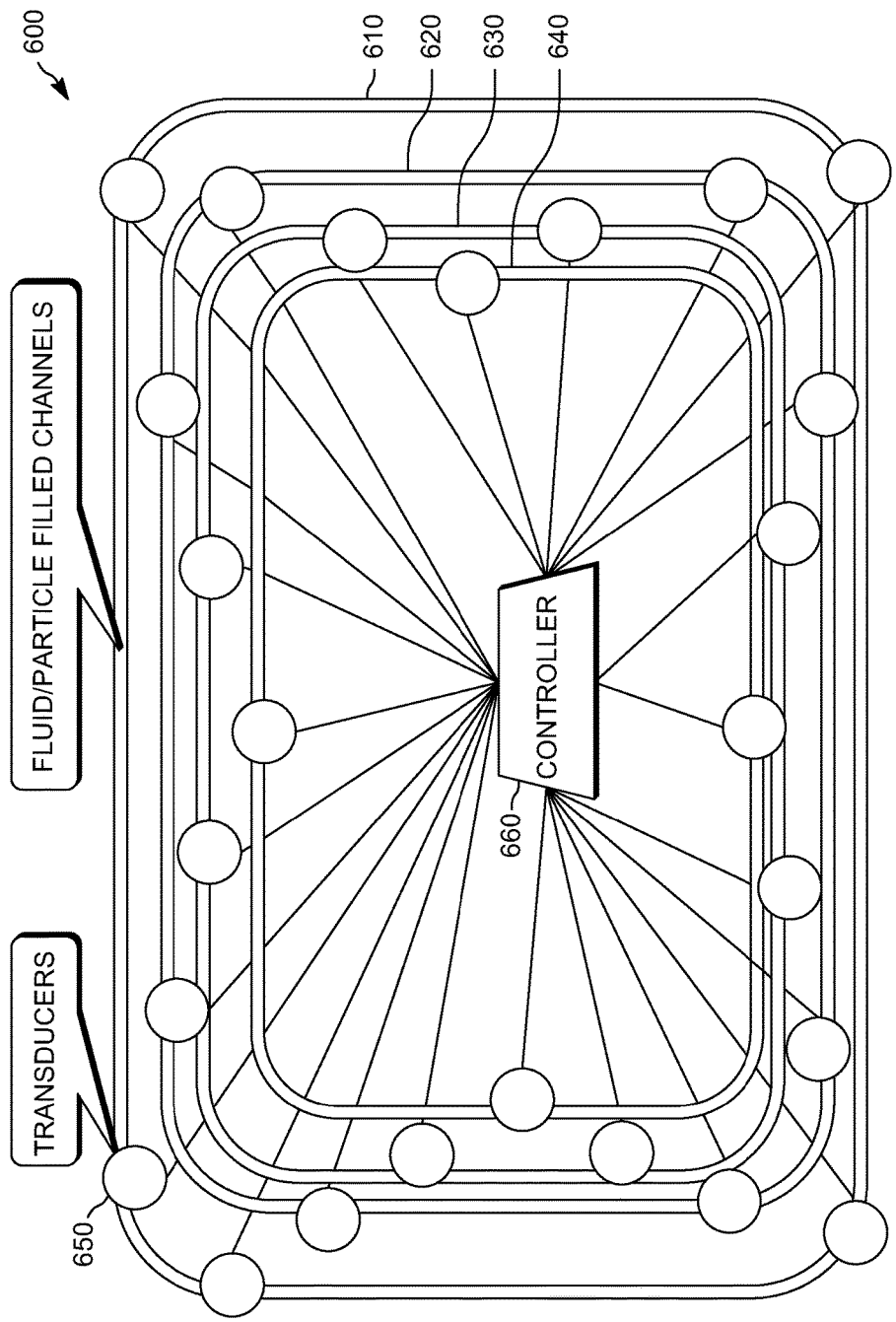
FIG. 6 illustrates an example of a matrix material that employs multiple vascular channels to facilitate heat flow from the material.

FIG. 6 illustrates an example of a matrix material 600 that employs multiple vascular channels to facilitate heat flow from the material. In this example, four vascular channels are shown at 610 though 640. Each channel 610-640 can be filled with fluids and particles as previously described which are excited via the filed-induced forces described herein. Although four channels (also referred to as vascular structures) are shown, more or less than four channels can be provided within the confines of a given matrix material 600. A plurality of transducers such as shown at 650 can be provided to direct field-induced forces at the channels 610-640. In this example, a single controller 660 is provided however as mentioned previously, multiple controllers can be provided which can control multiple transducer subsets to remove heat from all or portions of a given object.

Figure 7:
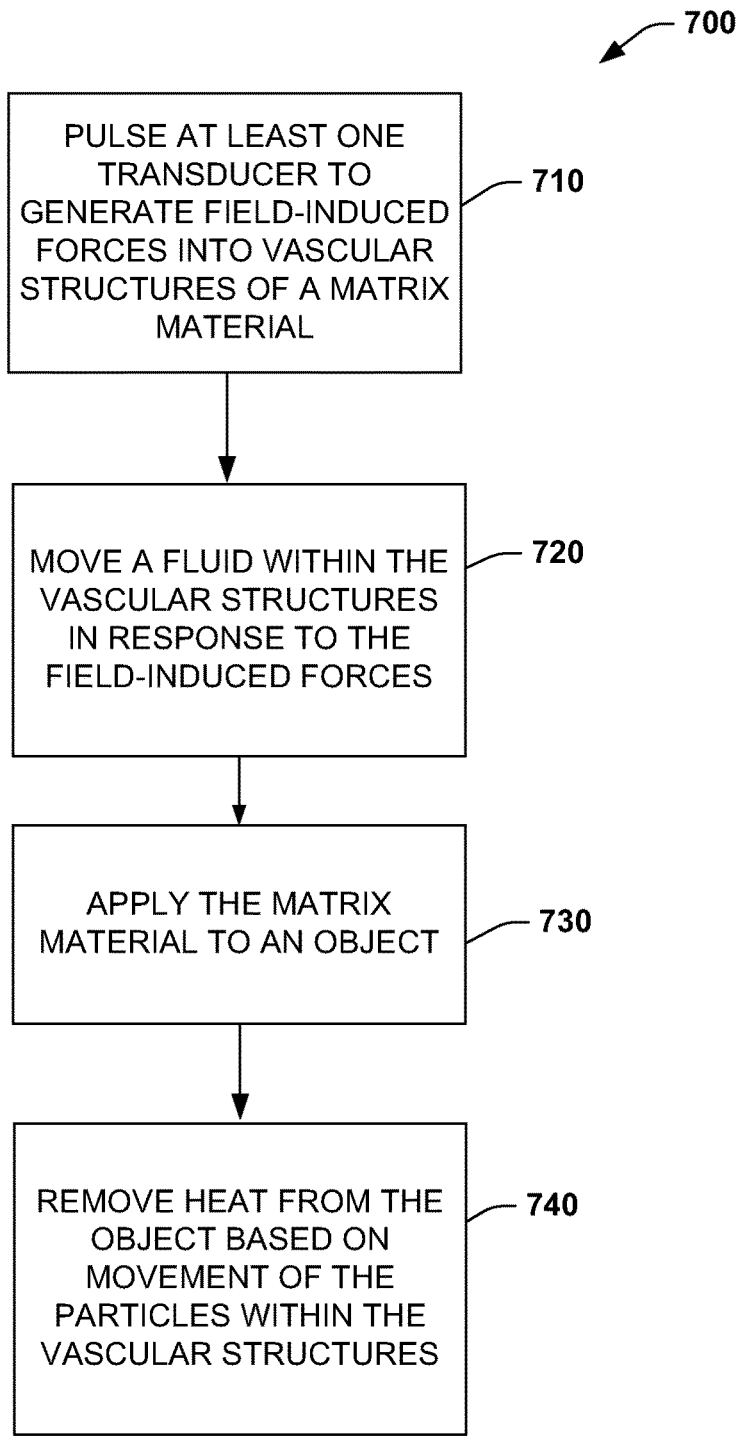
FIG. 7 illustrates an example of a method to remove heat from an object.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 7 illustrates an example of a method 700 to remove heat from an object. At 710, the method 700 includes pulsing at least one transducer to generate field-induced forces into vascular structures of a matrix material (e.g., via controller 120 of FIG. 1). At 720, the method 700 includes moving a fluid within the vascular structures in response to the field-induced forces (e.g., via the transducers 1 though N of FIG. 1). At 730, the method 700 includes applying the matrix material to an object. At 740, the method 700 includes removing heat from the object based on movement of the particles within the vascular structures of the matrix material in response to the field-induced forces. Although not shown, the method 700 can also include applying a predetermined pattern of pulses to the transducer(s) to generate the field-induced forces. The pulses can include a pulse frequency and a pulse duty cycle. The method 700 can also include receiving temperature feedback from the object to control a pulse frequency or a pulse duty cycle applied to the at least one transducer. The pulse frequency can be varied in frequency based on a given size (e.g., diameter) of the vascular structures.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
   a matrix material to remove heat from an object, the matrix material includes a plurality of vascular structures, each of the vascular structures are filled with a fluid;
   at least one transducer to apply field-induced forces into the fluid within the vascular structures of the matrix material; and
   at least one controller to pulse the at least one transducer to generate the field-induced forces in the fluid within the vascular structures, the field-induced forces generate fluid flow within the vascular structures to remove the heat from the object, wherein the at least one controller controls a pulse frequency and a pulse duty cycle applied to the at least one transducer, where the pulse frequency is within a range of potential pulse frequencies and is varied in frequency based on a given size of the vascular structure.

2. The system of claim 1, wherein the at least one controller applies a predetermined pattern of pulses to the at least one transducer to generate the field-induced forces.

3. The system of claim 1, wherein the at least one controller receives temperature feedback from the object to control the pulse frequency within the range of the pulse frequency for the given size of the vascular structure or the pulse duty cycle applied to the at least one transducer.

4. The system of claim 1, wherein the object includes at least one of an aircraft, a land vehicle, a printed circuit board, and an electronic device, and the matrix material is applied to a portion of the object to remove heat from the object.

5. The system of claim 1, wherein the vascular structures are cylindrical or cuboid structures that are filled with the fluid.

6. The system of claim 5, wherein the vascular structures are circular tubes or linear ducts that are filled with the fluid.

7. The system of claim 1, wherein the fluid is at least one of Deionized Water, Anhydrous Ammonia, Propylene, Betaine, Ethylene Glycol, Diethylene Glycol, Propylene Glycol, Liquid Nitrogen, Liquid Oxygen, and Freon.

8. The system of claim 7, wherein the fluid includes suspended particles, the suspended particles include at least one of aluminum and copper.

9. The system of claim 8, wherein the matrix material is at least one of a carbon, an epoxy, and a polymer.

10. The system of claim 1, wherein the at least one transducer generates acoustic energy, ultrasonic energy, or electromagnetic energy to apply the field-induced forces into the fluid within the vascular structures of the matrix material.

11. An apparatus, comprising:
    a matrix material to remove heat from an object,
    a plurality of vascular structures embedded in the matrix material, each of the vascular structures are filled with a fluid; and
    a plurality of particles with higher heat capacity than the fluid suspended in the fluid to facilitate the removal of heat from the object based on movement of the particles, the movement of particles within the fluid are in response to field-induced forces applied to the vascular structures by at least one transducer in response to a pattern of pulses, the pattern of pulses having a pulse frequency and a pulse duty cycle, wherein the pulse frequency is within a range of potential pulse frequencies and is varied in frequency based on a given size of the vascular structure.

12. The apparatus of claim 11, wherein the vascular structures are cylindrical, cuboid or polyhedral structures that are filled with the fluid.

13. The apparatus of claim 12, wherein the vascular structures are circular tubes or linear ducts that are filled with the fluid.

14. The apparatus of claim 11, wherein the fluid is at least one of Deionized Water, Anhydrous Ammonia, Propylene, Betaine, Ethylene Glycol, Diethylene Glycol, Propylene Glycol, Liquid Nitrogen, Liquid Oxygen, and Freon.

15. The apparatus of claim 14, wherein the suspended particles include at least one of aluminum and copper.

16. The apparatus of claim 15, wherein the matrix material is at least one of a carbon, an epoxy, and a polymer.

17. A method, comprising:
    pulsing at least one transducer, via a controller, to generate field-induced forces in vascular structures of a matrix material, where the controller controls a pulse frequency and a pulse duty cycle applied to the at least one transducer, where a range of potential pulse frequencies is determined based on a given size of vascular structures of the matrix material;
    moving a fluid, via the transducer, within the vascular structures in response to the field-induced forces;

applying the matrix material to an object; and removing heat from the object based on movement of particles within the vascular structures of the matrix material in response to the field-induced forces.

18. The method of claim 17, further comprising applying a predetermined pattern of pulses to the at least one transducer to generate the field-induced forces, the pulses include a pulse frequency and a pulse duty cycle.

19. The method of claim 17, further comprising receiving temperature feedback from the object to control a pulse frequency or a pulse duty cycle applied to the at least one transducer.

\* \* \* \* \*